United States Patent
Tysowski

(10) Patent No.: US 9,008,635 B2
(45) Date of Patent: *Apr. 14, 2015

(54) METHOD OF DISPLAYING A MAP ON A PHONE SCREEN

(71) Applicant: BlackBerry Limited, Waterloo (CA)

(72) Inventor: Piotr Konrad Tysowski, Waterloo, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,349

(22) Filed: Jan. 24, 2014

(65) Prior Publication Data

US 2014/0141758 A1    May 22, 2014

Related U.S. Application Data

(63) Continuation of application No. 13/338,568, filed on Dec. 28, 2011, now Pat. No. 8,639,272, which is a continuation of application No. 12/015,022, filed on Jan. 16, 2008, now Pat. No. 8,090,389.

(51) Int. Cl.
| | |
|---|---|
| *H04M 3/42* | (2006.01) |
| *H04W 24/00* | (2009.01) |
| *H04W 4/02* | (2009.01) |
| *H04M 1/56* | (2006.01) |
| *H04M 1/57* | (2006.01) |
| *H04M 1/725* | (2006.01) |
| *H04L 29/08* | (2006.01) |

(52) U.S. Cl.
CPC *H04W 4/02* (2013.01); *H04M 1/56* (2013.01); *H04M 1/575* (2013.01); *H04M 1/72572* (2013.01); *H04W 4/023* (2013.01); *H04L 67/18* (2013.01)

(58) Field of Classification Search
None
See application file for complete search history.

(56) References Cited

U.S. PATENT DOCUMENTS

| 8,081,992 B2* | 12/2011 | Book | 455/457 |
| 8,090,389 B2* | 1/2012 | Tysowski | 455/457 |
| 8,639,272 B2* | 1/2014 | Tysowski | 455/457 |
| 8,774,825 B2* | 7/2014 | Forstall et al. | 455/456.1 |
| 2003/0147518 A1* | 8/2003 | Albal et al. | 379/207.15 |
| 2008/0232571 A1* | 9/2008 | Millard et al. | 379/207.12 |

* cited by examiner

*Primary Examiner* — Erika A Washington
(74) *Attorney, Agent, or Firm* — Moffat & Co.

(57) ABSTRACT

A wireless communications device includes a radiofrequency transceiver having a wireless voice channel for transmitting and receiving voice communications and a separate wireless data channel for concurrently transmitting and receiving other data. The wireless communications device also includes a memory operatively connected to a processor for processing current location data received over the data channel from another communications device with which the wireless communications device is simultaneously communicating on the voice channel. The wireless communications further includes a display for displaying a phone screen during a voice call, the phone screen presenting call-related information. A map is displayed on the phone screen during the voice call, the map presenting a location current of the other communications device based on the current location data received over the data channel. Optionally, the map can also show the current location of the wireless communications device.

17 Claims, 12 Drawing Sheets

METHOD OF DISPLAYING A MAP ON A PHONE SCREEN

CROSS-REFERENCE TO RELATED APPLICATIONS

This application is a continuation of U.S. patent application Ser. No. 13/338,568 filed Dec. 28, 2011, now U.S Pat. No. 8,639,272, which is a continuation of U.S. patent application Ser. No. 12/015,022 filed on Jan. 16, 2008, now U.S. Pat. No. 8,090,389.

TECHNICAL FIELD

The present disclosure relates generally to wireless communications devices and, in particular, to dual-mode wireless communications devices capable of simultaneously transmitting both voice and data.

BACKGROUND

Some wireless communications devices are known as dual-mode or Class A devices because they have separately operable voice and data communication channels, thus enabling them to send and receive data (e.g. for e-mails, SMS, or Web-browsing) while the user is concurrently engaged in a phone call or voice call. When the device is engaged in a phone call, a phone screen is typically displayed, showing call-related information such as the name of the other party, the telephone number associated with the other party, and the time elapsed on the call.

Accessing further information about the other party, including any data received over the data channel while the call is ongoing, is typically not feasible while the call is underway because this conventionally requires that the call be terminated to enable access to e-mail, SMS, browsers or other device applications. This presents an inconvenience for the user of the device who is already engaged in a voice call, and who does not wish to terminate the call in order to access other information pertaining to the other party or parties to the call.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

GENERAL

Figure 1:
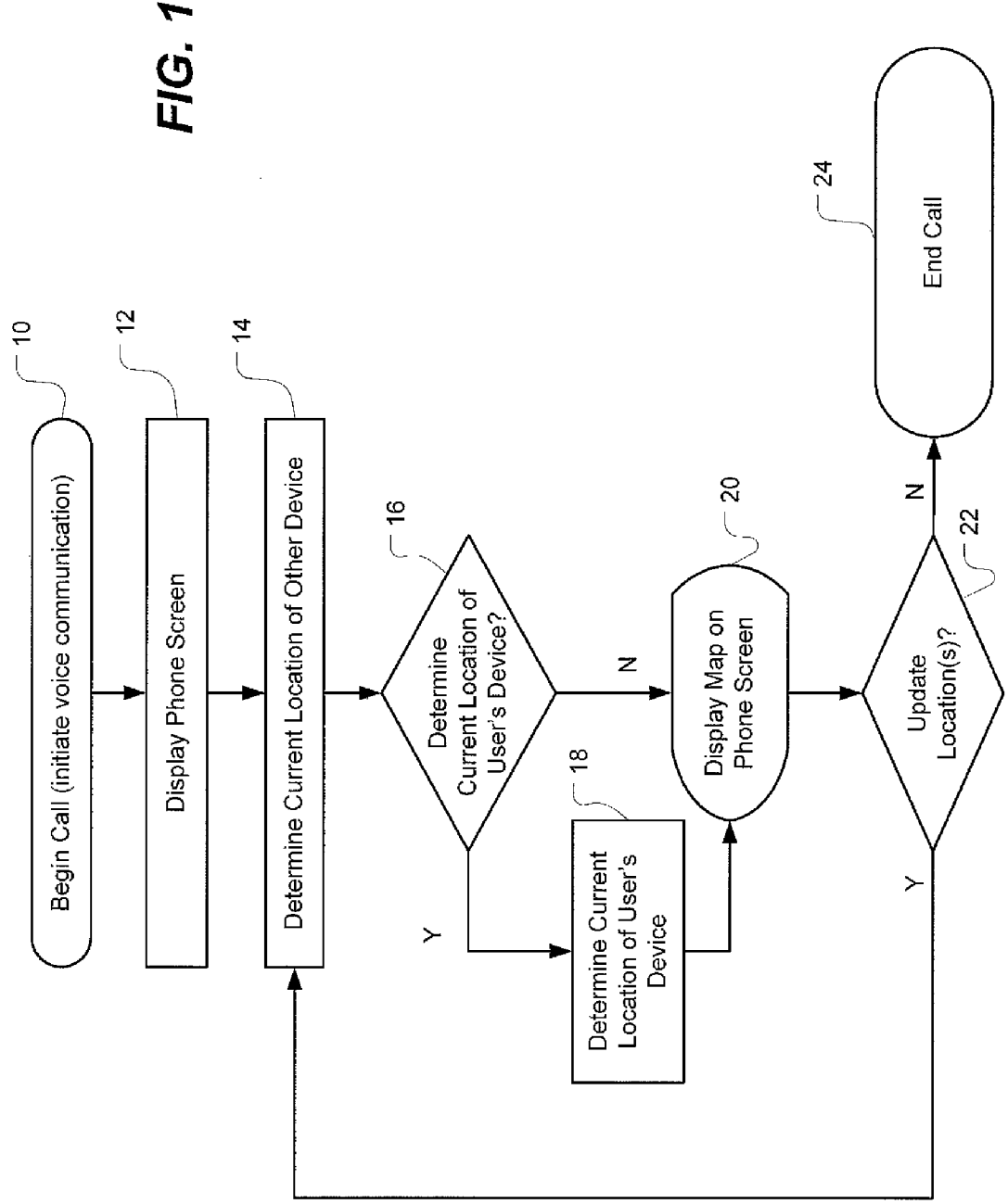
FIG. 1 is a flowchart outlining steps of a method of displaying information on a display of a wireless communications device in accordance with implementations of the present technology.

The present technology may generally provide a method, wireless communications device and computer program product that enable mapping of a current location of one or more parties to a phone call (or voice call) on a phone screen that is displayed onscreen during the phone call. This map, which may be embedded in the phone screen, may graphically present very useful location information to the user of the wireless communications device along with other optional call-related information such as, for example, the name of the other party, the area code and telephone number associated with the other party, and the time elapsed during the phone call. This innovation preferably solves a problem recognized by Applicant that, during a phone call, the calling parties cannot easily share current location information and view maps of these current locations without separately launching a map application, which conventionally requires that the call first be terminated.

Accordingly, an aspect of the present technology may be a method of displaying information on a display of a wireless communications device. The method may comprise steps of displaying a phone screen during a voice call, the phone screen presenting call-related information, determining a current location of a device connected to the voice call, and displaying a map of the current location of the device connected to the voice call within the phone screen.

Another aspect of the present technology may be a computer program product having code which, when loaded into memory and executed on a processor of a wireless communications device, is adapted to perform the steps of displaying a phone screen during a voice call, the phone screen presenting call-related information, determining a current location of a device connected to the voice call, and displaying a map of the current location of the device connected to the voice call within the phone screen.

Yet another aspect of the present technology may be a wireless communications device that includes a radiofrequency transceiver having a wireless voice channel for transmitting and receiving voice communications and a separate wireless data channel for concurrently transmitting and receiving other data. The device may also comprise a memory operatively connected to a processor for processing current location data received over the data channel from another communications device with which the wireless communications device is simultaneously communicating on the voice channel. The device may further comprise a display for displaying a phone screen during a voice call, the phone screen presenting call-related information, and a map displayed on the phone screen during the voice call, the map presenting a location current of the other communications device based on the current location data received over the data channel.

DESCRIPTION OF PREFERRED EMBODIMENTS

The details and particulars of these aspects of the technology will now be described below, by way of example, with reference to the attached drawings.

FIG. 1 is a flowchart outlining main steps in a method of displaying information on a display of a wireless communications device during a voice call. As depicted in FIG. 1, an initial step 10 of this method is to begin a call, i.e. to initiate voice communication with another party (or other communication device). This is done by placing a call to another party, by setting up a conference call with more than one party, or by receiving a call. Once a voice call is either being set up (in the case of an outgoing call) or is established or underway (in the case of an incoming call), a phone screen is displayed on the display of the device (step 12). In other words, when the user places a call to another party, the phone screen shows the number being dialed and then shows that the party is being called (e.g. "Calling John Smith" or "Calling 613-555-1212"). When the call is connected, the phone screen optionally changes to indicate that the call is connected (e.g. "Call Connected to John Smith 613-555-1212"). Alternatively, for an incoming call, the phone screen would display the name and/or number of the calling party (e.g. "John Smith 613-555-1212") and then when the called party answers the call, the phone screen may optionally change to indicate that the call is connected. The phone screen may also show the time elapsed for the call (usually in hours, minutes and seconds) or, in the case of an outgoing call, the time elapsed since the call has been placed. The displaying of name, number and time elapsed ("call-related information") is well known in the art of telephony.

As further depicted in FIG. 1, the method further includes a step 14 of determining a current location of the other party. This is accomplished by determining the current location of the communications device with which the user's communications device is communicating, i.e. the "other" device on the call. This can be done either directly or indirectly. This can be done indirectly, for example, by looking up an area code or prefix of the telephone number or by looking up the name of the other party in a directory or database that contains address information or some proxy for location such as a postal code or Internet Protocol (IP) address. This can be done directly, for example, by receiving location information or location data from the other party's device that describes the current location of that other party, such as, for example, GPS position coordinates, the name of a city, street address, the closest cell tower or Wi-Fi access point, or other location-identifying information. Receiving the location data corresponding to the current location of the other party can be done in a variety of different ways. GPS coordinates can be received directly or via an intermediate entity such as a server or relay. Alternatively, the device could receive a URL in an HTML string for invoking a browser session. Alternatively, the device could receive a link or URL to a map server for obtaining the map to be displayed. The map data can be processed either server-side or client-side to create map having a desired size and resolution. The step of determining a current location of the other device connected to the voice call can be performed in different ways, e.g. automatically when the call connection is established (by having the other device configured to automatically send its location in an e-mail, SMS or as another type of datagram over a data channel). In that scenario, the device receiving the location information may be configured to automatically intercept and process the message or datagram to extract the location information without interfering with the voice call and utilize that location information to present the location information on a phone screen map. Alternatively, as another example, the location information can be sent upon request e.g. by configuring the other device to be responsive to a specific (explicit) request for location information initiated by the first user device trying to establish a call connection. The request for location information could be either explicit or implicit and sent separately once the call is established or incorporated as part of the initial call signalling or call setup phase. The sending of location information by the other communications device can, in turn, be triggered by a number of different events depending on how the information is to be sent (e.g. automatically or based on a request), e.g. when the request for establishing the voice call is received, when the call connection is finally established, or by any other event trigger related to the setting up or establishment of the call connection or alternatively by an explicit location information request from the first user device.

As shown in FIG. 1, the method includes an optional step 16 of determining whether to obtain current location information for the user's device. This will generally depend on the user device's own preferences and settings. In other words, the user device may be configured to show a map of only the other party's location or, alternatively, to show a map of the current locations of both parties to the call (or to all parties involved in a multi-party conference call).

If a decision at step 16 is made to determine the current location of the user's device, then this is done at step 18. Determining the current location of the user's own device can be done in a number of ways. For example, determining the current location of the user's device at step 18 can be done expeditiously using Global Positioning System (GPS). A GPS receiver chipset or Bluetooth™-connected GPS puck can be used to acquire a GPS position fix for a GPS-enabled wireless communications device. Depending on the positional accuracy that is sought, other technologies can be used to determine current location, including triangulation based on cell station signals, or the identification of the closest base station. As noted above, the use of GPS is an expeditious and accurate way of obtaining a position fix for the user's device. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As shown in FIG. 1, the method then includes a step 20 of displaying a map on the phone screen. The map presents graphically the current location of the other party (other communications device) and optionally also the current location of the user and his device. Examples of this embedded map are presented below with reference to FIGS. 4 to 11. A map embedded within the phone screen is very convenient because it obviates the need to separately launch a mapping application for viewing the mapped location of the other party. Since the map is embedded within the phone screen, the user merely has to glance down at the phone screen to see right away where the other party is located (and optionally also to see where the user is relative to the other party).

Optionally, at step 22, a decision is made as to whether or not to update the current location of the other party and/or of the user. Automatic updating of the current location(s) would be regulated by having the device consult the user's settings and preferences (or alternatively by prompting the user to make a choice to update or not). If a decision is made to update the current location, which would represent the usual device configuration, then operations loop back to step 14 whereupon the map is updated upon receipt of new location information. Otherwise, if no updating is to occur, the map remains fixed until the call is ended at step 24. In a variant, the user could manually update the location by invoking an update command (either at the user's own initiative or when prompted by the device).

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This novel method can be implemented on a dual-mode Class A wireless communications device having concurrent voice and data capabilities, i.e. a device having separate and distinct wireless voice and data channels so that location data can be exchanged while the call is ongoing. Wireless communications device, for the purposes of this specification, shall include any wireless handheld, smart phone, PDA, tablet, laptop or other communications device that is capable of dual-mode operation for concurrent transmission and reception of voice and data.

Figure 2:
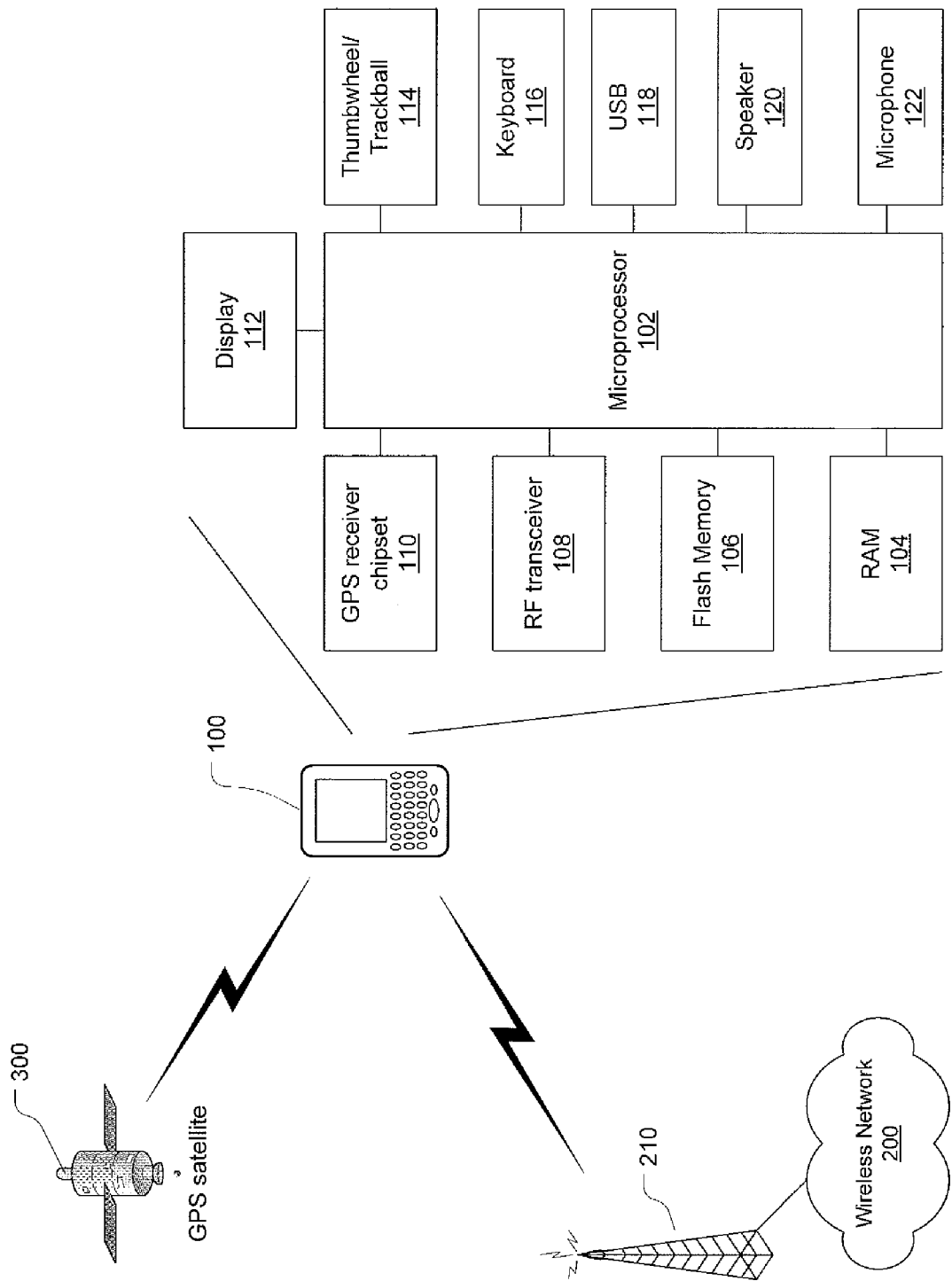
FIG. 2 is a block diagram of main components of a GPS-enabled wireless communications device which is presented as one example of a device on which the present technology can be implemented.

FIG. 2 is a block diagram depicting certain main components of an exemplary wireless communications device 100. It should be expressly understood that this figure is intentionally simplified to show only certain components; the device 100 may include other components beyond those shown in FIG. 2. The device 100 includes a microprocessor 102 (or simply a "processor") which interacts with memory in the form of RAM 104 and flash memory 106 to enable a variety of device functions and to execute an operating system for running software applications loaded on the device. The device 100 includes a dual-mode radiofrequency (RF) transceiver 108 for communicating wirelessly with a base station 210 of a wireless network 200. The RF transceiver includes both a wireless voice channel for transmitting and receiving voice communications and a separate wireless data channel for concurrently transmitting and receiving other (i.e. non-voice) data.

The device 100 optionally includes a GPS receiver chipset 110 for receiving GPS radio signals transmitted from one or more orbiting GPS satellites 300. The GPS receiver chipset 110 can be embedded within the device or externally connected, such as, for example, a Bluetooth™ GPS puck or dongle.

In terms of input/output devices or user interfaces (UI's), the device 100 typically includes a display 112 (e.g. a small LCD screen), a thumbwheel and/or trackball 114, a keyboard 116, a USB 118 or serial port for connecting to peripheral equipment, a speaker 120 and a microphone 122. The device's display 112 may optionally be a touchscreen, in which case a separate conventional keyboard/keypad would be unnecessary.

Figure 3:
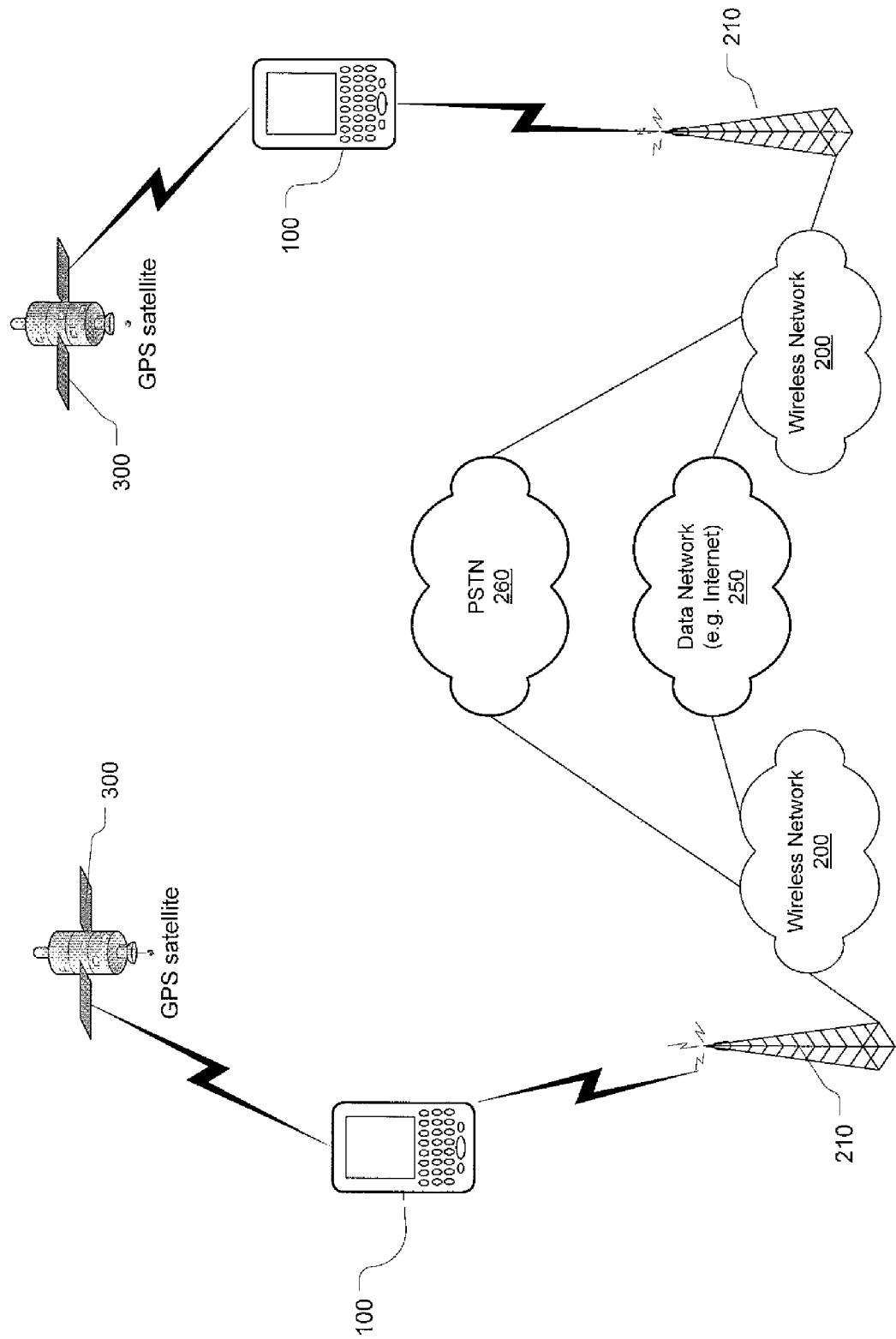
FIG. 3 illustrates an example of a communications network in which a pair of exemplary wireless communications devices can share and map current location information in accordance with the present technology.

FIG. 3 illustrates an example of a communications network in which a pair of exemplary wireless communications devices 100 can share and map current location information in accordance with the present technology. In this example network, each device 100 communicates through respective base stations 210 which are part of respective wireless networks 200. The wireless networks 200 are connected by a data network 250 (e.g. the Internet) for routing IP data packets and by the Public Switched Telephone Network (PSTN) 260 for circuit-switching the voice call. Alternatively, depending on their proximity, the devices can be connected directly through a single wireless network (without routing any data or voice through the Internet or PSTN). The network architecture shown in FIG. 3 is thus only one example of a network on which the present technology can be implemented. Other networks can be used to enable a device to determine or receive current location information and to map the current location of the other party while on a voice call with the other party. It should also be noted that the voice call itself could be carried on a packet-switched network (e.g. voice over IP, or VoIP) along with the location data. In this particular implementation of the technology, the device can operate using only the single data channel which carries both the VoIP data and the location data.

FIGS. 4 to 11 present a variety of examples of phone screens having embedded or overlaid maps of the current location of one or more of the parties to a voice call. These variants are presented to illustrate the variation features and attributes of the technology and should not be interpreted as representing the only implementations of this technology. Other combinations and modifications to the various features and attributes of the phone screen are, of course, possible.

Figure 4:
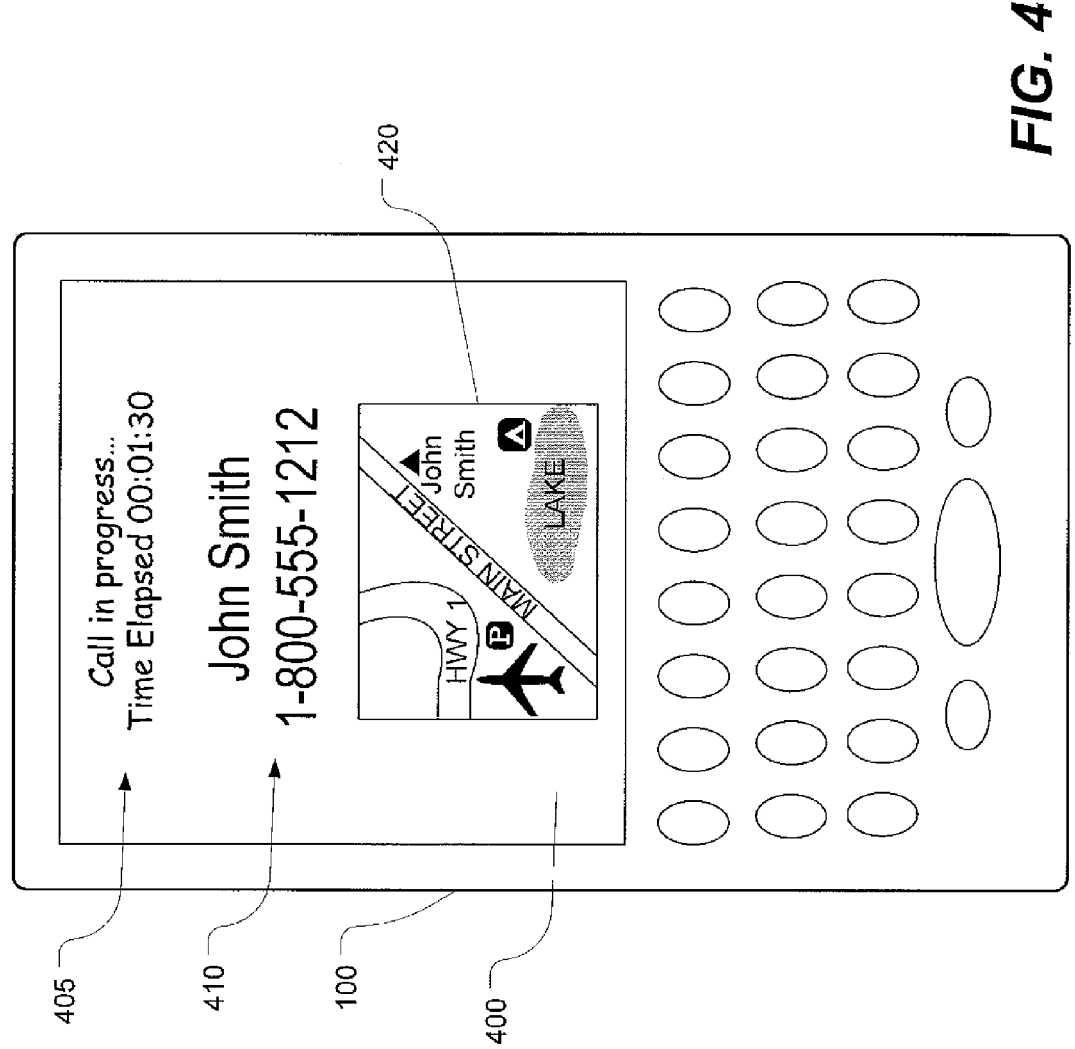
FIG. 4 is a schematic depiction of an example of a wireless communications device having a phone screen with an embedded map in accordance with one implementation of the present technology.

FIG. 4 is a schematic depiction of a first example of a wireless communications device 100 having a phone screen 400 with an embedded map 420 in accordance with one implementation of the present technology. As shown in this particular implementation, the phone screen occupies the entire area of the display of the device. This is generally preferable to optimize the readability of the call-related information presented on the phone screen. However, in other implementations, the phone screen could occupy only a portion of the available onscreen area of the display. As depicted in FIG. 4, the phone screen 400 optionally includes call-related information 405, 410 in addition to the map 420. The call-related information can include elapsed time 405 and/or the name of the other party and the other party's telephone number 410.

Figure 5:
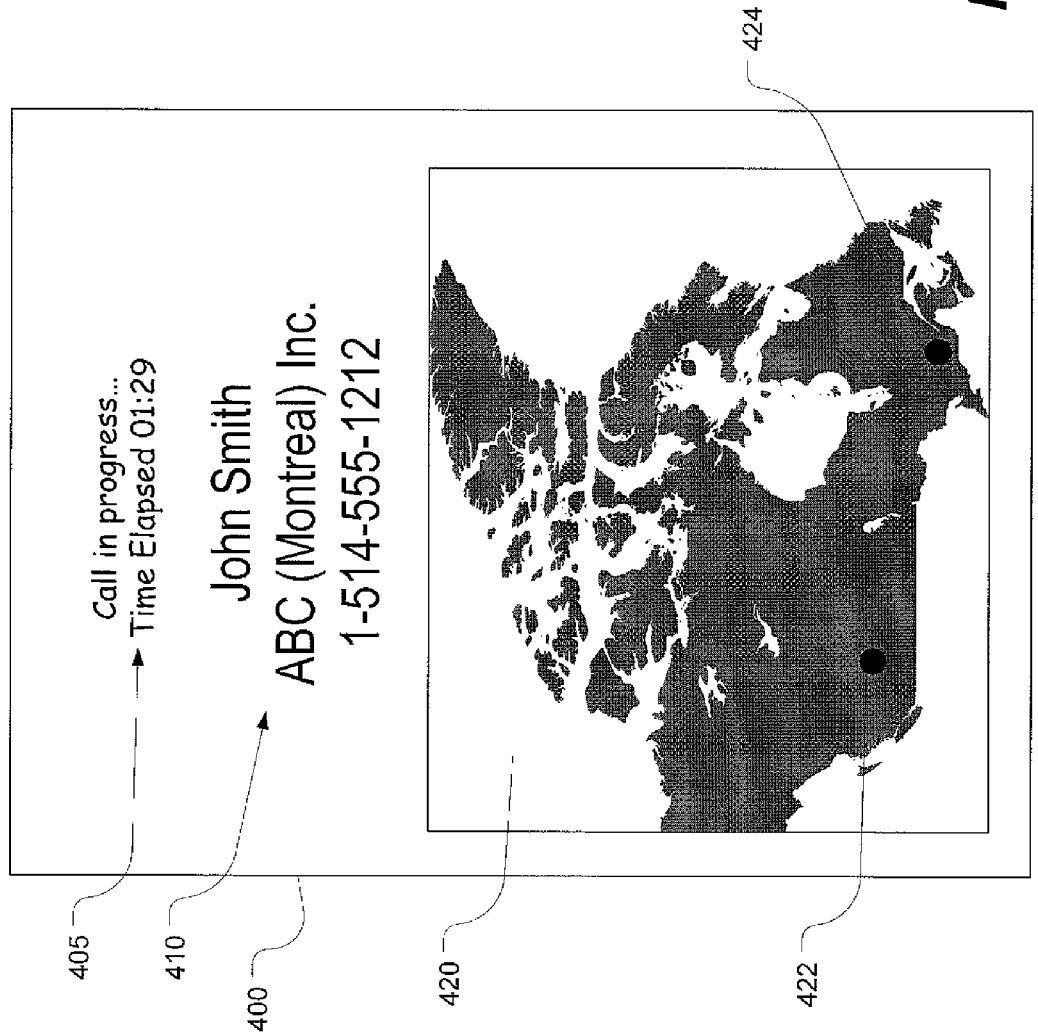
FIG. 5 is a schematic depiction of another example of a phone screen having an embedded map in accordance with another implementation of the present technology.

FIG. 5 is a schematic depiction of another example of a phone screen 400 having an embedded map 420 in accordance with another implementation of the present technology. In this example implementation, the map 420 contains a graphical indicator for indicating the current location of the user's wireless device (icon/symbol 422) and another graphical indicator for indicating the current location of the other party (icon/symbol 424). Different icons or symbols can be used. Words or abbreviations can also be used to specify which location corresponds to the other party, although this will in most cases be readily apparent. For example, for the user who calls a contact in Montreal from Calgary, as shown in FIG. 5, it will generally not be necessary to label the location indicators 422, 424 because the caller will recognize his geographical location right away and know immediately that the other location corresponds to the other party. In this example, address information can be included optionally in the call-related information 410, which may also assist the user, particular where, as in this case, the address information provides an indication or clue as to the location of the other party.

Figure 6:
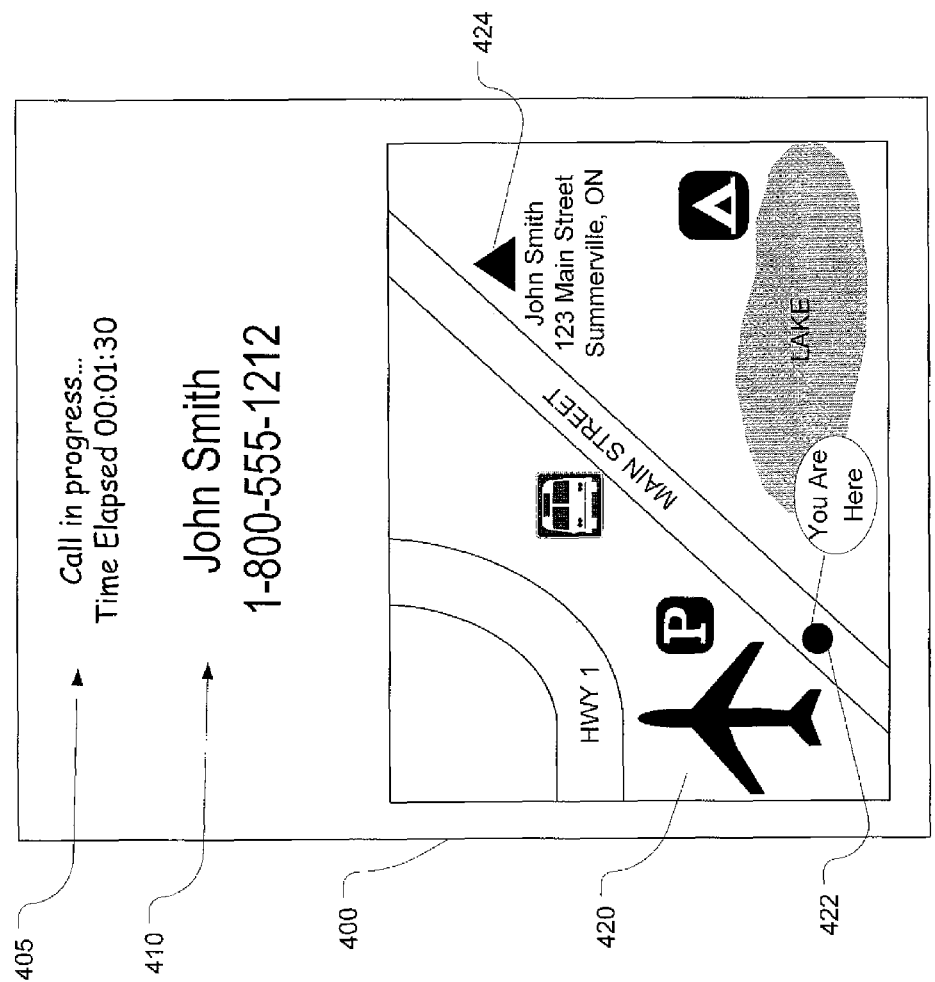
FIG. 6 is a schematic depiction of another example of a phone screen having an embedded map with address information in accordance with yet another implementation of the present technology.

FIG. 6 is a schematic depiction of another example of a phone screen 400 having an embedded map 420 with address information in accordance with yet another implementation of the present technology. In this particular implementation, which is again presented merely by way of example, the map can include optional address information beside an icon or symbol or name representing the other party. In this example, the other party is John Smith whose current location is represented on the map 420 with a triangular black icon 424. John Smith's name and/or address information (e.g. street address) is inscribed beneath his location indicator 424. Optionally, but not shown, address information for the user's current location could also be shown onscreen. Alternatively, as shown in FIG. 6, a bubble or arrow indicating "You Are Here" can point the user to location indicator 422 to clarify that this onscreen indicator corresponds to the user's current location.

Figure 7:
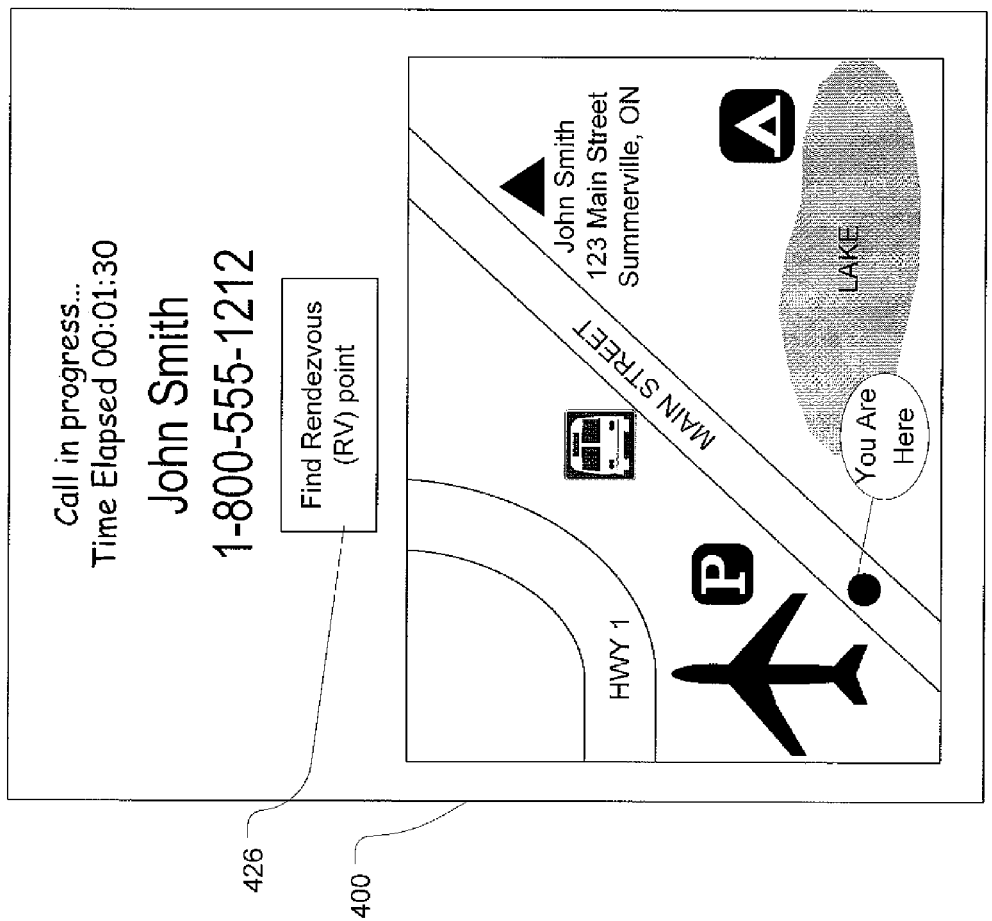
FIG. 7 is a schematic depiction of another example of a phone screen having an embedded map with address information and a rendezvous-locating feature in accordance with yet another implementation of the present technology.

FIG. 7 is a schematic depiction of another example of a phone screen 400 having an embedded map 420 with address information and a rendezvous-locating feature 426 in accordance with yet another implementation of the present technology. The rendezvous-locating feature in this example is triggered by clicking on an onscreen link that computes and proposes a landmark or point of interest (POI) as a potential rendezvous location based on the current location of the wireless communications device and the current location of the other communications device. The rendezvous feature thus determines a recognizable landmark or POI that is approximately midway between the locations of the two parties to the call, and then proposes that as a suitable rendezvous point.

Figure 8:
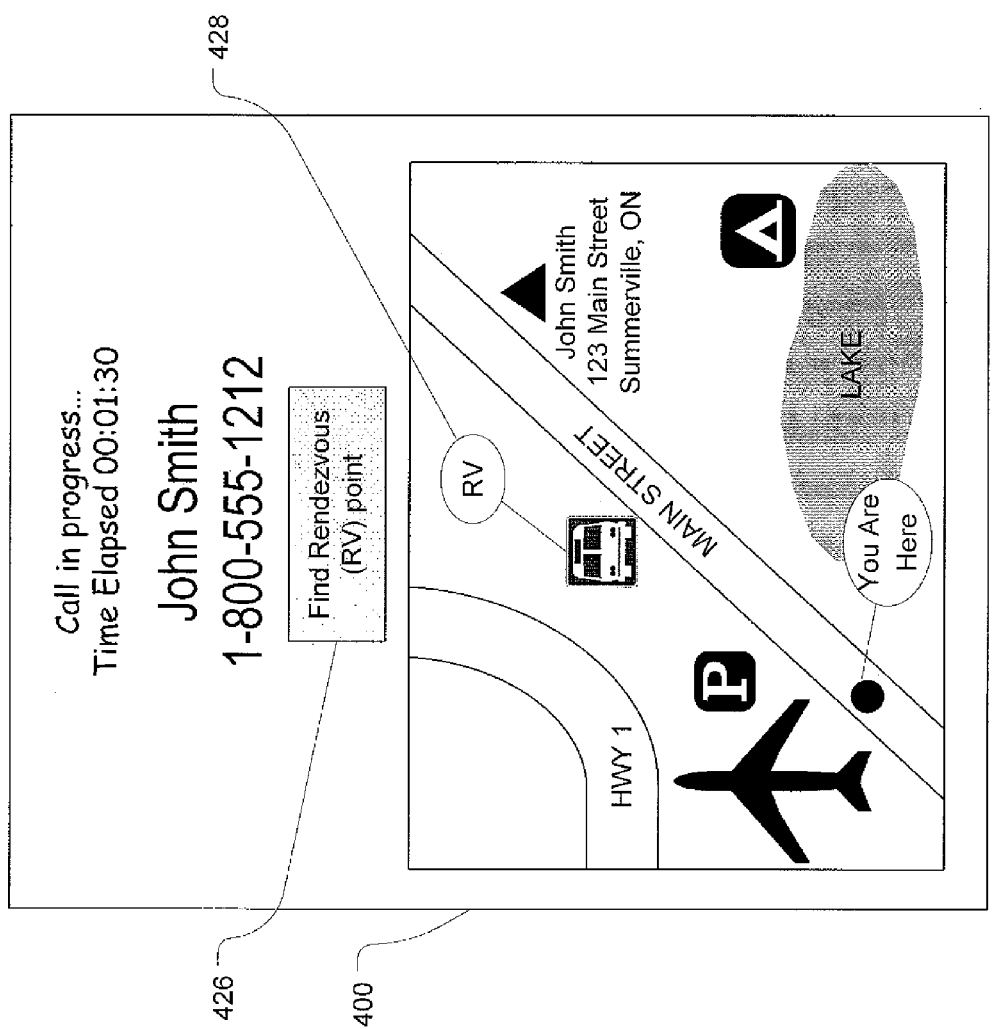
FIG. 8 is a schematic depiction of another example of a phone screen having an embedded map with address information and further showing a rendezvous location in accordance with yet another implementation of the present technology.

FIG. 8 is a schematic depiction of another example of a phone screen 400 having an embedded map 420 with address information and further showing a rendezvous location 428 in accordance with yet another implementation of the present technology. In FIG. 8, the rendezvous location 428 is the bus station labelled "RV" for rendezvous. Optionally, once the RV location has been displayed onscreen, the "Find Rendezvous (RV) Point" button or link 427 can be greyed out to show that it is disabled. Optionally, the proposed RV point can be either accepted or rejected by either party by first proposing the RV point to one or both parties and then awaiting their acceptance or rejection. This proposal-acceptance/rejection can, of course, be done over the data communication channel without affecting the voice call.

Figure 9:
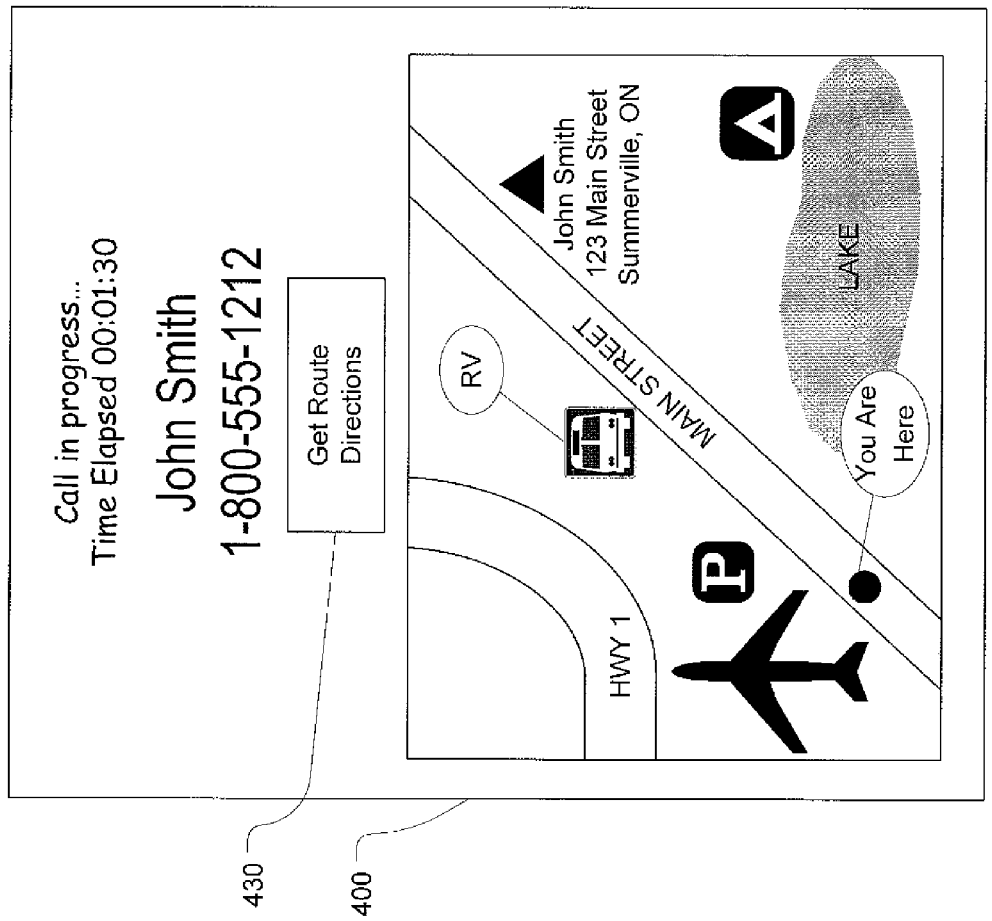
FIG. 9 is a schematic depiction of another example of a phone screen having an embedded map with address information and further showing a link to get route directions in accordance with yet another implementation of the present technology.

FIG. 9 is a schematic depiction of another example of a phone screen 400 having an embedded map 420 with address information and further showing a link to get route directions 430 in accordance with yet another implementation of the present technology. In this example, the user can select the button or link 430 to get route directions either to the RV point or to the current location of the other party.

Figure 10:
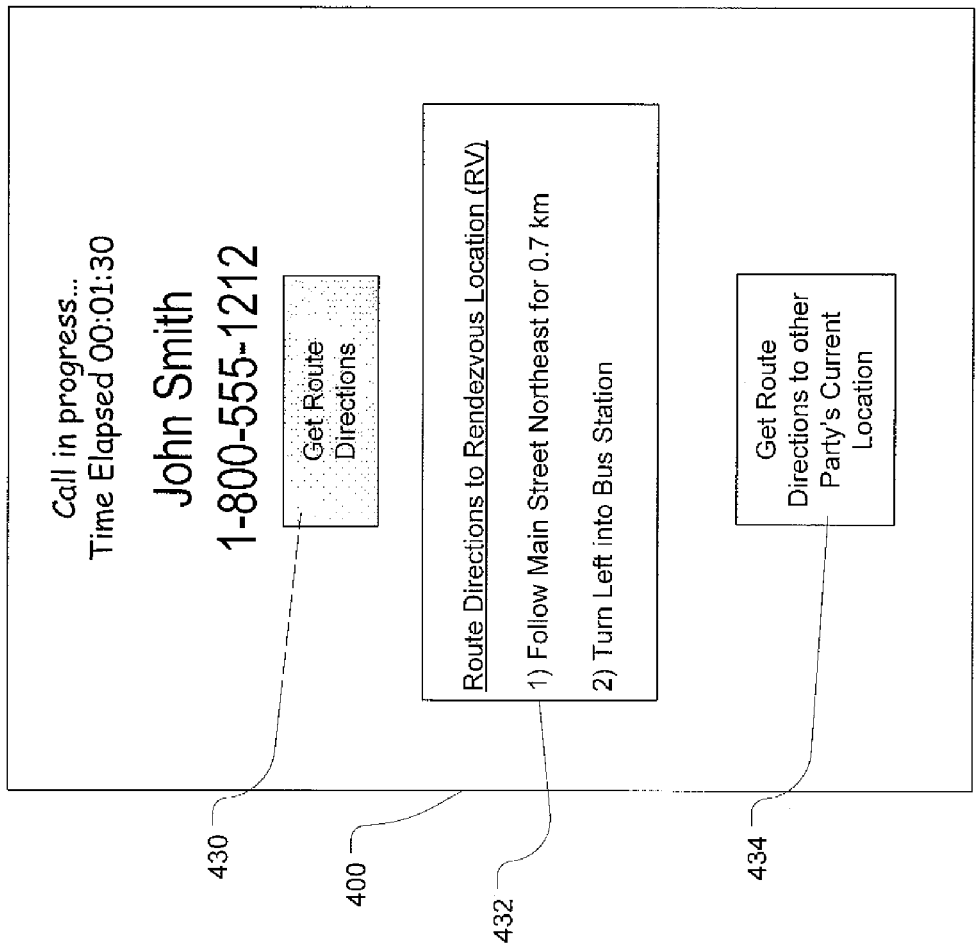
FIG. 10 is a schematic depiction of another example of a phone screen showing route directions and further showing a link to get route directions to another party's current location in accordance with yet another implementation of the present technology.

FIG. 10 is a schematic depiction of another example of a phone screen 400 showing route directions in a route direction text box 432 and further showing a link 434 to get route directions to another party's current location in accordance with yet another implementation of the present technology. In other words, the link 434 enables the user to seek route directions to the other party after having received route directions to the RV point. As will be appreciated, the device can be configured in many different ways to allow the device to present these various features and options in different ways or based on different priorities.

Figure 11:
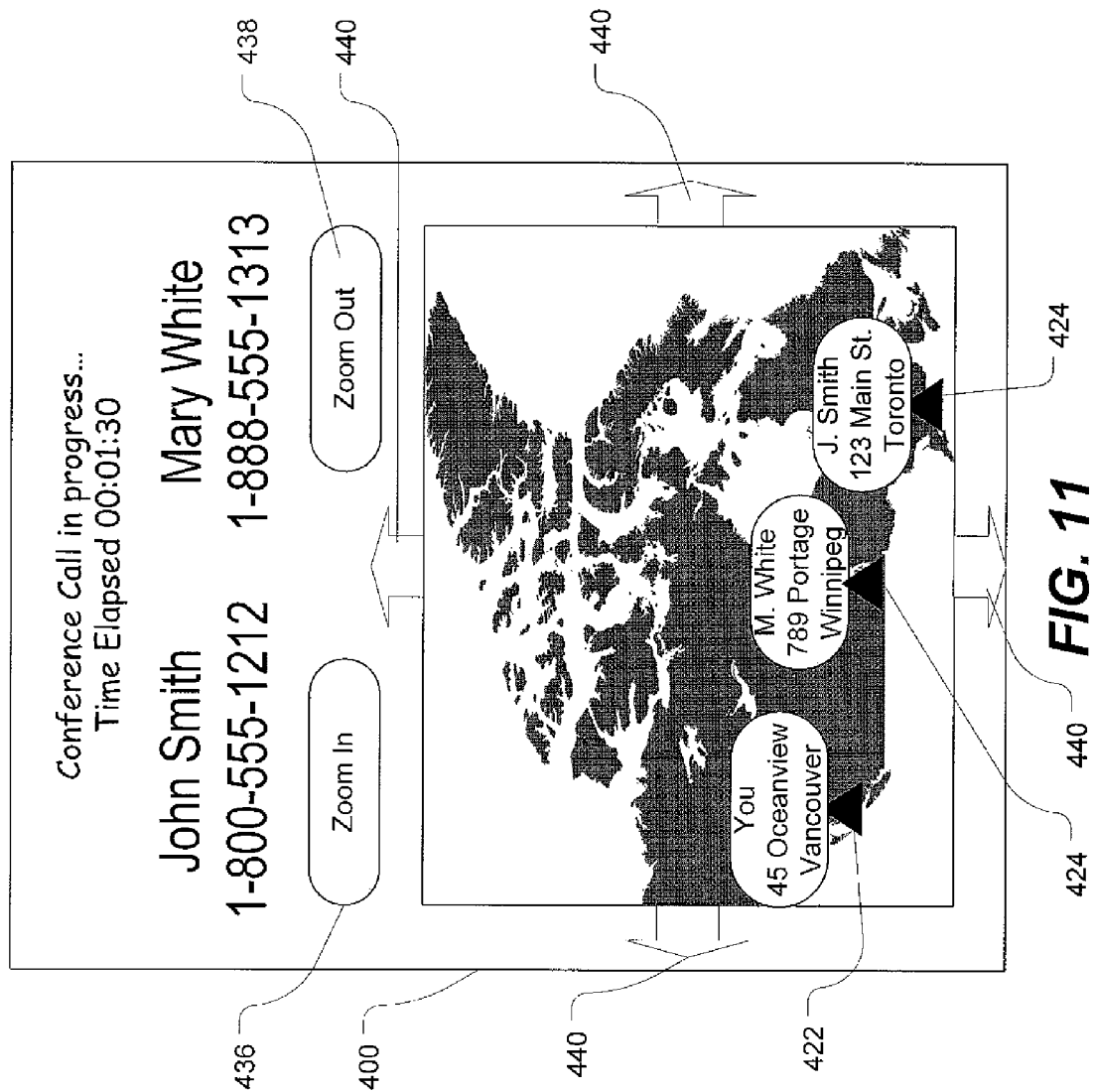
FIG. 11 is a schematic depiction of another example of a phone screen for a three-party conference call in which the current locations of each of the three parties is displayed on the onscreen map along with address information for each party.

FIG. 11 is a schematic depiction of another example of a phone screen 400 for a three-party conference call in which the current locations of each of the three parties are displayed on the onscreen map along with address information for each party. In this example phone screen, the map of Canada is shown for the cross-country teleconference involving the user (e.g. "You" located at 45 Oceanview, Vancouver) and two other parties, e.g. John Smith at 123 Main Street, Toronto and Mary White at 789 Portage, Winnipeg. Onscreen on the map, each current location is shown using a triangular icon 422, 424. Address information is shown in a bubble above each triangular icon 422, 424. The map can be zoomed in or out using a Zoom In button 436 and a Zoom Out button 438. The map can be panned up and down and side to side using pan arrows 440.

Figure 12:
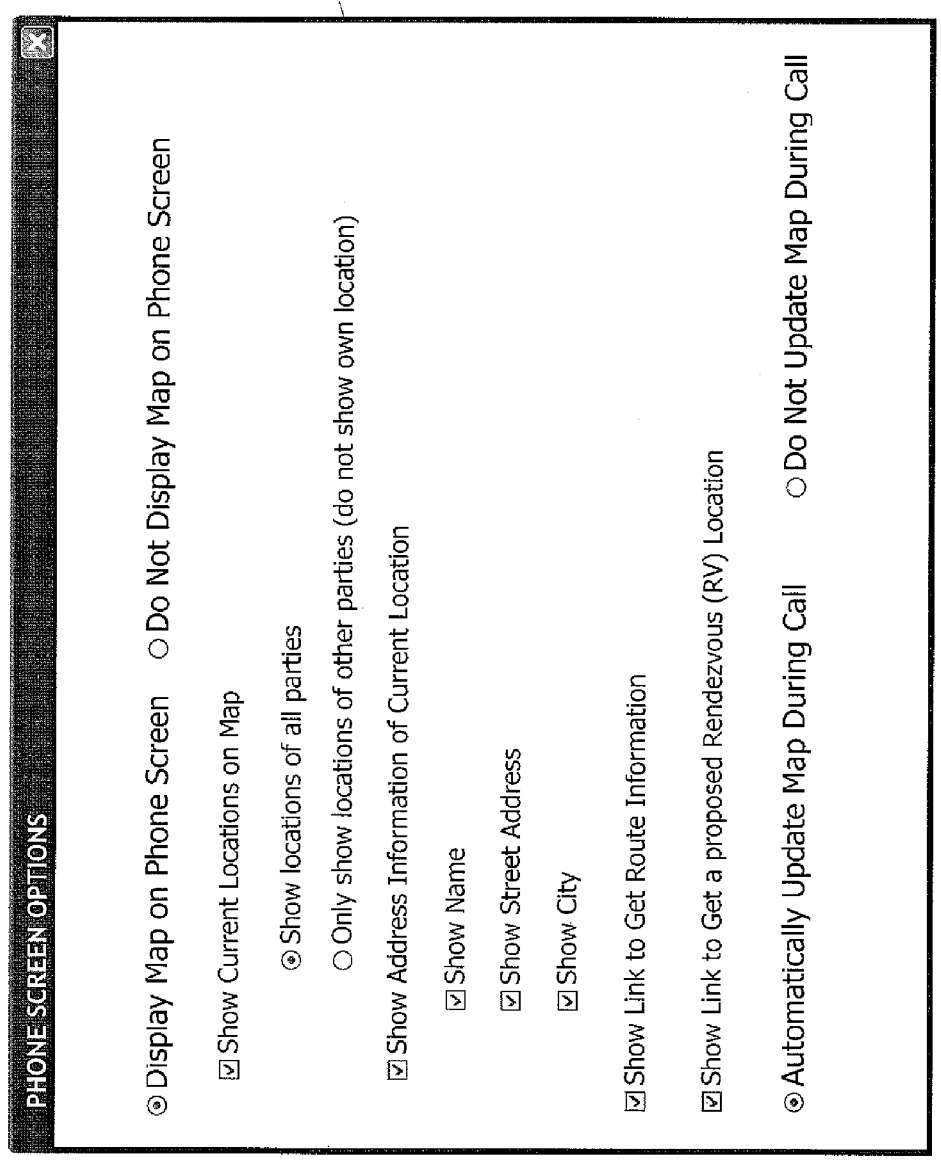
FIG. 12 is a schematic depiction of a phone screen options page for enabling a user of the wireless communications device to configure or customize the device's phone screen so that the embedded map is displayed according to the various settings and preferences.

FIG. 12 is a schematic depiction of a phone screen options page 500 for enabling a user of the wireless communications device 100 to configure or customize the device's phone screen so that the embedded map 420 is displayed according to the various settings and preferences. This options page is presented merely by way of example. The settings and preferences shown are merely representative of some of the configurable features that could be regulated by the user using an options page. These include, for example, enabling or disabling the embedded map feature, showing all or only some of the locations of the parties to the call, how to show address information (name, street, city, etc), whether to show links to get route information or a rendezvous location, and whether to update the map automatically. These, it should be emphasized, are merely some examples of configurable settings.

In another implementation, the map can be enlarged to occupy the entire onscreen area of the display, i.e. maximized to occupy the entire phone screen. This can be done by clicking or double-clicking on the map itself or by another form of user input. The enlarged/maximized map can remain enlarged temporarily (i.e. for a predetermined period of time before returning to its smaller default size) or, alternatively, the map can remain fully enlarged until the call ends or until the device receives subsequent user input signalling that the map is to be reduced to its original size so as to display the other aspects of the phone screen.

In yet another implementation, the phone screen could include a "compass" showing the heading and distance to the other person (e.g. "John Smith 2 km north"). The heading and distance information can be provided in addition to the map or instead of the map. Another variant could have a map displayed only of the user's current position with the "compass information" (i.e. heading and distance information) presented either adjacent to or beside the map or superimposed on the map. A directional arrow from the current location on the map could be used to graphically illustrate the direction to the other party. The distance to the other party could then be presented within a floating text bubble associated (and movable) with the directional arrow. In some implementations of this technology, an options page enables the user to select preferences and settings in order to configure various aspects of the manner in which the location information of the other caller is presented in the phone screen.

This new technology has been described in terms of specific implementations and configurations which are intended to be exemplary only. The scope of the exclusive right sought by the Applicant is therefore intended to be limited solely by the appended claims.

The invention claimed is:

1. A method of displaying information on a display of a wireless communications device, the method comprising:
   receiving a voice call from a calling device;
   determining a location of the calling device by searching a directory stored in a memory of the wireless communications device that has received the voice call;
   displaying a phone screen in response to the receiving of the voice call, the phone screen presenting call-related information;
   displaying a map within the phone screen, the map showing the location of the calling device;
   proposing a rendezvous location based on the current location of the wireless communications device and the location of the calling device; and
   displaying a user interface element to display the rendezvous location on the map.

2. The method as claimed in claim 1 wherein the call-related information includes a telephone number of the calling device and a caller name associated with the calling device.

3. The method as claimed in claim 1 further comprising zooming the map to display both a current location of the wireless communications device and the location of the calling device.

4. The method as claimed in claim 1 further comprising displaying a street address on the map associated with the location of the calling device.

5. The method as claimed in claim 4 further comprising displaying a street address on the map associated with the current location of the wireless communications device.

6. A non-transitory computer readable medium comprising code which, when loaded into memory and executed on a processor of a wireless communications device, causes the wireless communications device to:
   receive a voice call from a calling device;
   determine a location of the calling device by searching a directory stored in a memory of the wireless communications device that has received the voice call;
   display a phone screen in response to the receiving of the voice call, the phone screen presenting call-related information;
   display a map within the phone screen, the map showing the location of the calling device;
   proposing a rendezvous location based on the current location of the wireless communications device and the location of the calling device; and
   displaying a user interface element to display the rendezvous location on the map.

7. The computer readable medium as claimed in claim 6 wherein the call-related information includes a telephone number of the calling device and a caller name associated with the calling device.

8. The computer readable medium as claimed in claim 6 further comprising code for zooming the map to display both a current location of the wireless communications device and the location of the calling device.

9. The computer readable medium as claimed in claim 6 further comprising code for displaying a street address on the map associated with the location of the calling device.

10. The computer readable medium as claimed in claim 9 further comprising code for displaying a street address on the map associated with the current location of the wireless communications device.

11. A wireless communications device comprising:
    a radiofrequency transceiver for receiving a voice call from a calling device;
    a processor coupled to a memory, the processor determining a location of the calling device by searching a directory stored in a memory of the wireless communications device that has received the voice call; and
    a display for displaying a phone screen in response to the receiving of the voice call, the phone screen presenting call-related information, wherein the phone screen comprises a map showing the location of the calling device; and
    a processor configured to propose a rendezvous location based on the current location of the wireless communications device and the location of the calling device and to cause the display to display a user interface element which, when selected, displays the rendezvous location on the map.

12. The wireless communications device as claimed in claim 11 further comprising a GPS receiver for determining a current location of the wireless communications device.

13. The wireless communications device as claimed in claim 12 comprising a processor for zooming the map to display both the current location of the wireless communications device and the location of the calling device.

14. The wireless communications device as claimed in claim 12 wherein the processor is configured to cause the display to display a street address on the map associated with the current location of the wireless communications device.

15. The wireless communications device as claimed in claim 11 wherein the call-related information includes a telephone number of the calling device and a caller name associated with the calling device.

16. The wireless communications device as claimed in claim 11 wherein the processor is configured to cause the display to display a street address on the map associated with the location of the calling device.

17. The wireless communications device as claimed in claim 11 wherein the processor is configured to cause the display to present virtual pan arrow elements for panning the map and to also present zoom-in and zoom-out buttons for zooming the map.

* * * * *